United States Patent [19]
Lunski et al.

[11] Patent Number: 5,858,279
[45] Date of Patent: Jan. 12, 1999

[54] STABILIZED TRIPLE DEFOAMER COMPOSITION

[75] Inventors: Michael S. Lunski, Hightstown; Steven A. Bolkan, Hopewell, both of N.J.

[73] Assignee: Church & Dwight Co., Inc, Princeton, N.J.

[21] Appl. No.: 961,864

[22] Filed: Oct. 31, 1997

[51] Int. Cl.$^6$ .................................................. B01D 19/04
[52] U.S. Cl. .................. 252/321; 252/358; 510/421; 510/506; 510/511
[58] Field of Search .................................. 252/321, 358; 510/511, 466, 506, 421

[56] References Cited

U.S. PATENT DOCUMENTS

| | | | |
|---|---|---|---|
| 5,045,232 | 9/1991 | Dahanayake | 252/321 |
| 5,283,004 | 2/1994 | Miura | 252/358 |
| 5,695,575 | 12/1997 | Angevaare et al. | 134/25.2 |

OTHER PUBLICATIONS

Degussa Technical Library, GP–17, Degussa Synthetic Amorphous Silicas for Foam Control Agents, 1994.

*Primary Examiner*—Paul Lieberman
*Assistant Examiner*—Gregory E. Webb
*Attorney, Agent, or Firm*—Irving Fishman

[57] ABSTRACT

A defoaming composition comprising about 1 to about 90% by weight of a mixture of at least three defoaming agents, (a), (b), and (c) and about 99 to about 10% by weight of at least two stabilizers (d) and (e) therefor, and optionally a carrier therefor, where defoamer (a) is selected from a hydrophilic, fumed, particulate silica; defoamer (b) is an ethylene oxide-propylene oxide block copolymer; and defoamer (c) is a linear alcohol alkoxylate mixture of poly(oxyethylene/polyoxypropylene) mono- $C_6$, $C_8$, and $C_{10}$ alkyl ethers; stabilizer (d) is an ethoxylated $C_{12-18}$ fatty alcohol having a molecular weight of about 820; and stabilizer (e) is a cross-linked (meth)acrylic acid polymer.

19 Claims, No Drawings

STABILIZED TRIPLE DEFOAMER COMPOSITION

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to the field of defoaming and antifoaming cleaning compositions and cleaning aids. It is especially relevant to industrial cleaning aids. It is also highly relevant to the field of cleaners and cleaning aids related to the cleaning of electronic parts, especially miniaturized equipment having many small and hard to reach spaces. Additionally, the invention applies to the field of metal, ceramic, glass, and plastic cleaning or processing where the formation of foam is an undesirable event. This invention specifically relates to aqueous and semi-aqueous cleaning where foam is typically problematical.

BACKGROUND OF THE INVENTION

Cleaning compositions for all sorts of purposes create suds or foam. This foaming action is a disadvantage in many contexts as it makes dealing with effluent wash baths difficult and bothersome. The foam can get in the way of the user and obstruct the user's vision of the item being cleaned so that the substrate must be rinsed just to see if it is now clean or needs further treatment, and, in situations where spacing is tight, the foam itself can get in the way of the cleaning solution reaching, cleaning, and rinsing away from the substrate tight spaces. Excessive foam will also cause cavitation of pump systems, greatly reducing the efficiency and effectiveness of spray systems. Excessive foam will also cause sump bath spill over with loss of active cleaning agents. Defoaming is also important in connection with heavy soil baths and in connection with water soluble cutting fluids based on soaps. For these reasons, low foaming cleaning materials and defoamers (to cut or eliminate the foam that is otherwise present) have found wide acceptance and usefulness.

Many different types of compounds have been used for defoaming purposes in different contexts. In general, it has been said that defoamers are "systems related" and that the characteristics of the formulation intended to act as the defoamer, as well as the characteristics of the liquid to be wetted, must be taken into account. Hence, it is extremely difficult to transfer the teachings and experience from one group of agents acting on one foaming system to the same (or another) group of agents acting on another foaming system. See Degussa Technical Bulletin #42, "Synthetic Silicas for Defoamers". This Bulletin also details the use of silica, both hydophobic as well as hydrophilic types, as defoamers.

Silicone oils are also used as defoaming agents and have been found to be extremely effective materials. However, the silicone oils suffer from a major drawback in that they tend to remain on the surface of the parts being cleaned, which can adversely affect post-process operations such as painting, plating, welding, bonding, etc.

Furthermore, once a suitable defoamer has been identified, it must also be formulated for suitable delivery without adversely affecting the defoaming properties. As multiple defoamers are incorporated into a single defoaming product, the ability to adequately and advantageously formulate them into a single product becomes much more difficult. Yet, it is extremely important that when more than one defoamer is to be employed, the various defoamers used, as well as the carrier formulation for them, do not adversely affect one another.

One difficulty is the possible result of multiple phases. When this happens, not all of the defoamers will necessarily reach all of the desired areas. For example, a highly hydrophobic defoamer in combination with a highly hydrophilic defoamer blended together to act on a particular foaming composition will frequently separate into distinctive layers. Attempts to remix these layers during or just before use are frequently ineffective, time consuming, and can be quite costly.

For all these reasons, and many more which are apparent to those of ordinary skill in this art, single phase multiple defoaming agent compositions would be extremely useful, either as separate cleaning aids or as components to be added directly to the cleaners. It is just as useful for the components of such a single phase defoamer to be invcorporated separetly as raw materials into a cleaning product rather than formulating a pre-blend of the multiple defoamers.

Furthermore, when used as part of the cleaning composition, the total elimination of foaming action may be just as undesirable as excess foaming action. Hence, it is critical that the defoamer action be matched carefully with the cleaning composition to which it will be added.

OBJECTS OF THE INVENTION

It is therefore an object of the invention to provide a single phase, multiple defoamer composition.

It is another object of the invention to provide a single phase multiple defoamer composition in which at least more than one mode of defoaming action is present.

It is still another object of the invention to provide a single phase defoaming composition having at least one defoaming agent from each of three different modes of defoaming agent activity.

It is still another object of the invention to provide a non-silicone containing defoaming composition.

It is yet another object of the invention to provide a single phase multiple defoamer additive for a normally foaming cleaning composition.

It is an even further object of the invention to provide a rinse free defoamer composition which will not interfere with post cleaning operations.

It is still another object of the invention to provide a set of defoamer materials which can be incorporated into otherwise foaming products to control the foaming action.

Still other objects of the invention will be appreciated by those of ordinary skill in the art.

BRIEF SUMMARY OF THE INVENTION

These and other objects of the invention can be achieved by a defoaming composition comprising about 1 to about 90% by weight of a mixture of at least three defoaming agents, (a), (b), and (c) and about 99 to about 10% by weight of a mixture of two stabilizers (d) and (e) therefor, and optionally a carrier therefor, where defoamer (a) is selected from a hydrophilic, fumed, particulate silica; defoamer (b) is an ethylene oxide-propylene oxide block copolymer; and defoamer (c) is a linear alcohol alkoxylate mixture of poly(oxyethylene/polyoxypropylene) mono- $C_6$, $C_8$, and $C_{10}$ alkyl ethers; stabilizer (d) is ethoxylated $C_{12-18}$fatty alcohol having a molecular weight of about 820 and stabilizer (e) is cross-linked (meth)acrylic acid homopolymer or a cross-linked acrylic acid/methacrylic acid copolymer.

BRIEF DESCRIPTION OF THE SEVERAL VIEWS OF THE DRAWINGS

Not Applicable

DETAILED DESCRIPTION OF THE INVENTION

The invention can be achieved by a defoaming composition comprising about 1 to about 90% by weight of a mixture of at least three defoaming agents, (a), (b), and (c) and about 99 to about 10% by weight of a mixture of two stabilizers (d) nad (e) therefor, and optionally a carrier therefor, where defoamer (a) is selected from a hydrophilic, fumed, particulate silica; defoamer (b) is an ethylene oxide-propylene oxide block copolymer; and defoamer (c) is a linear alcohol alkoxylate mixture of poly(oxyethylene/polyoxypropylene) mono- $C_6$, $C_8$, and $C_{10}$ alkyl ethers; stabilizer (d) is an ethoxylated $C_{12-18}$fatty alcohol having a molecular weight of about 820 and stabilizer (e) is a cross-linked (meth)acrylic acid homopolymer or a cross-linked acrylic acid/methacrylic acid copolymer.

Defoamer (a) can be selected from any hydrophilic, fumed, particulate silica. It is intended to act by physical bombardment of the foam. Advantageous silicas for purposes of the present invention include Degussa silicas under the names Aerosil 200, FK 383 DS, and Flatting Agent TS 100 as well as Ross Chemical products under the name Foam Blast. Particularly useful is Foam Blast 38-042-01 (Ross Chemical, Fountain Inn, SC).

Defoamer (b) is an ethylene oxide-propylene oxide block copolymer of the general formula (I) below:

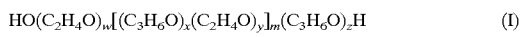

$$HO(C_2H_4O)_w[(C_3H_6O)_x(C_2H_4O)_y]_m(C_3H_6O)_zH \qquad (I)$$

where one, but not both, of w and z must be zero; x, y, and m must all be positive integers; and the total of w+z+(m(x+y)) is from about 40 to about 60, preferably about 43 to about 57, most preferably about 46 to about 50. Most preferably, the compound of formula I has a weight average molecular weight of about 2400 to about 2600, most preferably about 2500. In a preferred embodiment, z is zero. In another highly preferred embodiment m is one. In a most highly preferred embodiment, z is zero, m is one, and w and y are each the same, even more preferably, w and y are each about 2–3, x is about 35–40, z is zero and m is one. A highly preferred compound for this component is available from Olin Corporation under the name POLY-TERGENT (R) P-22A, in which z is zero and the weight average molecular weight is about 2500. Defoamer (b) generally works in the present invention by interfering with the formation of foam, typically by destabilizing the air/water interface and allowing for quick liquid drainage from foam channels which results in foam collapse.

Defoamer (c) is a linear alcohol alkoxylate mixture of poly(oxyethylene/polyoxypropylene) mono- $C_6$, $C_8$, and $C_{10}$ alkyl ethers, and typically works in the present invention in part via a dilution effect. Without being bound by theory, it is believed that these materials may also act in part by film interference. These materials are typically of formula II below

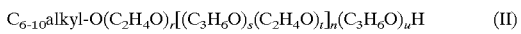

$$C_{6-10}alkyl-O(C_2H_4O)_r[(C_3H_6O)_s(C_2H_4O)_t]_n(C_3H_6O)_uH \qquad (II)$$

where one of r and u, but not both, is zero; s, t, and n are all positive integers, and the total of r+u+((n)(s+t)) is about 25 to about 45, preferably about 27 to about 39. Preferably r is zero. In a highly preferred embodiment, ((n)(s))+u is about 18 to about 27 and t is about 9 to about 18, and even more preferably n is 1. A highly suitable product for this component is POLY TERGENT (R) S250LF, available from Olin Corporation.

The combination of these three types of defoamers forms an unstable mixture which readily separates into different phases. It is only by incorporation of the stabilizers (d) and (e) that a single phase triple defoamer with these differing activities can result.

Stabilizer (d) is an ethoxylated $C_{12-18}$alkanol, having a weight average molecular weight of about 800 to about 840 with about 12 to about 15 ethoxy units per mole. A highly suitable commercial product for this component is PLURAFAC(R) RA-40 available from BASF.

Stabilizer (e) is a cross-linked (meth)acrylic acid homopolymer or a cross-linked acrylic acid/methacrylic acid copolymer. Preferably, stabilizer (e) is a cross-linked acrylic acid homopolymer. The cross-linking agents are preferably allyl ethers of a monosaccharides or disaccharides or allyl ethers of five or six carbon sugar alcohols, more preferably allyl ethers of pentaerythritol or sucrose. Preferably, stabilizer (e) has a molecular weight in the range of about 425,000 to 710,000, corresponding to approximately 6,000–10,000 repeating acid units. Suitable compounds for stabilizer (e) are commercially available from Goodrich under the Carbopol name. Most advantageous in the present invention for stabilizer (e) is Carbopol 625.

The concentrate composition of the present invention is generally 10–99% stabilizer (d) and 90–1% of a mixture of defoamer (a), defoamer (b), and defoamer (c), all such percentages being volume/volume based on the total volume of the concentrate composition. Defoamers (a)–(c) do not have to be pre-blended, but preferably are pre-blended. Components (a)–(c), in the aggregate are present preferably from about 90 to about 75%, more preferably about 89 to about 84%, even more preferably about 86–87%, most preferably about 86.7% of the concentrate composition. While the amounts of components (a)–(c) relative to each (based on weight) other may vary over a wide range, such as a:b:c from 1:1:98 to 1:98:1 to 98:1: 1, in a highly preferred embodiment, each of components (a), (b), and (c) are present in equal amounts (1: 1:1) based on weight.

Stabilizers (d) and (e) are present in the aggregate from about 90 to about 1% of the composition, preferably about 10 to about 25% v/v; more preferably about 11 to about 15%; even more preferably about 12% to about 14%, most preferably about 13.3% of the concentrate composition. Generally the ratio of stabilizer (d) to stabilizer (e) is from about 1:99 to 99:1, preferably from about 1:10 to about 20:1, more preferably from about 1:1 to about 15:1, still more preferably about 3:1 to about 12:1, even more preferably about 6:1 to about 8:1, and most preferably about 7.3:1.

The concentrate is prepared by mixing the ingredients in any order. However, preferably, components (a), (b), and (c) are added to a mixing vessel in any order. Stabilizers (d) and (e) are then added to the mixture, preferably with mild agitation. Preferably, stabilizer (d) is added before stabilizer (e); however, preblending of stabilizers (d) and (e) is also possible. If multiple agents are utilized for any component, the multiple agent may be added in any order, but preferably all of the component (a) agents are pre-mixed, all of the component (b) agents are pre-mixed, all of the component (c) agents are pre-mixed, all of the component (d) agents are pre-mixed, and all of component (e) agents are pre-mixed.

When desired, the above concentrate composition may be diluted with a suitable carrier, including, but not limited to, water, hydro-alcoholic solutions, commercial and other aqueous cleaning compositions. Alternatively, the individual components of the present invention can be added to any of the forgoing without ever having made the concentrate or the diluted composition mentioned above without departing from the present invention. The typical commercial aqueous cleaning compositions to which either the concentrate, the diluted composition, or the individual components (a)–(e) can be added include, without limitation, alkaline cleaners, acidicly based cleaners, rust preventatives, and metal cleaners. These include, without limitation, products such as ARMAKLEEN, M-AERO, M-AUTO, M-GP, and AQUA-WORKS (all available from Church & Dwight), 815-GD (available from Brulin), DARACLEAN (available from W. R. Grace), INPRO-CLEAN (available from Oakite Products), ALUMAX (available from Oakite), ALUMINUM SAFE (available from Oakite), ALTREX 24 (available from Novamax Technologies), TURCO AVIATION (available from Elf Atochem), ALCONOX DETERGENT (available from Alconox), 187B (available from Hubbard-Hall), RUST ARREST (available from Mangill) Sodium Silicate (available from Mangill), and AFCO33-84 (available from Fergusson), among others. When such a carrier is used, it may be present in amounts up to about 99.97v/v% of the diluted composition.

The invention composition (either concentrate or diluted formulations) is applied either together with or after a foaming detergent cleaning product has been utilized and reduction or prevention of foaming is desired. The compositions may also be pre-applied, but this is less desirable. Precise amounts of the concentrate or diluted formulations will vary with the particular foaming detergent composition used, the particular substrate being cleaned, and the amount of the foaming detergent composition used in the cleaning operation. As such, the amount of the invention products to be used in a particular operation are at the discretion of the user.

EXAMPLES

The following examples are presented merely to illustrate, but not limit, the present invention.

Example 1

The concentrate of the present invention is prepared by mixing in a single vessel sufficient in size to contain 110 gallons of product, the three defoamer components (a)–(c) of the invention as follows: 289 lbs of Olin POLY TERGENT (R) S205LF (available from Olin Corporation), 289 lbs of Olin POLY TERGENT(R) P-22A (available from Olin Corporation), and 289 lbs of FOAM BLAST 38-042-01 (available from Ross Chem, Inc.). 117 lbs of stabilizer PLURAFAC(R) RA-40 (available from BASF Corporation) is added with slight agitation, followed by 16 lbs of Carbopol 625 (available from Goodrich). The resultant product is a stable, single phase product.

Example 2

Example 1 is repeated without the addition of the stabilizer component. Even after extensive agitation, the product separates into distinct phases after a short time.

Example 3

Example 1 is repeated except that the POLYTERGENT (R) S205LF is replaced by related product POLYTERGENT (R) S405LF (available from Olin Corporation). The formulation is not stable and separates after a short time into distinct phases.

Example 4

Example 1 is repeated except that the POLYTERGENT (R) P-22A is replaced by related product POLYTERGENT (R) P-17A (available from Olin Corporation). The formulation is not stable and separates after a short time into distinct phases.

Example 5

Example 1 is repeated except that the FOAM BLAST is replaced by a hydrophilic silica obtained from Degussa Corporation Aerosol EXP-11. The formulation is acceptable.

Example 6

Example 1 is repeated except that the FOAM BLAST is replaced by a hydrophobic silica obtained from Degussa Corporation). The formulation is not stable and separates after a short time into distinct phases.

Example 7

Example 1 is repeated except that the PLURAFAC RA-40 is replaced by related product PLURAFAC RA-30 (available from BASF Corporation). The formulation is not stable and separates after a short time into distinct phases.

We claim:

1. A defoaming concentrate composition comprising about 1 to about 90% by weight of a mixture of at least three defoaming agents and about 99 to about 10% by weight of a mixture of stabilizers therefor, and optionally a carrier therefor, said mixture of at least three defoaming agents comprising defoamer (a) which is selected from the group consisting of hydrophilic, fumed, particulate silicas and mixtures thereof;

defoamer (b) which is selected from the group consisting of ethylene oxide-propylene oxide block copolymers and mixtures thereof, and defoamer (c) which is selected from the group consisting of poly(oxyethylene/polyoxypropylene) mono-$C_6$, $C_8$, and $C_{10}$ linear alkyl ethers and mixtures thereof; wherein components (a), (b), and (c) are present in about equal amounts by weight; and said mixture of stabilizers comprising:

stabilizer (d), which is selected from the group consisting of ethoxylated $C_{12-18}$ fatty alcohols having a molecular weight of about 800 to about 840 and mixtures thereof; and stabilizer (e), which is selected from the group consisting of cross-linked (meth)acrylic acid homopolymers and cross-linked acrylic acid/methacrylic acid copolymers and mixtures thereof.

2. The defoaming concentrate composition of claim 1 wherein component (b) is an ethylene oxide-propylene oxide block copolymer of the general formula (I)

$$HO(C_2H_4O)_w[(C_3H_6O)_x(C_2H_4O)_y]_m(C_3H_6O)_zH \qquad (I)$$

where one, but not both, of w and z is zero; x, y, and m are all be positive integers; and the total of w+z+(m(x+y)) is from about 40 to about 60.

3. The defoaming concentrate composition of claim 2 wherein z is zero, m is one, w and y are the same and either 2 or 3 and x is about 35 to about 40.

4. The defoaming concentrate composition of claim 1 wherein defoamer (c) is a linear alcohol alkoxylate mixture of poly(oxyethylene/polyoxypropylene) mono- $C_6$, $C_8$, and $C_{10}$ alkyl ethers of formula II $$C_{6\text{-}10}\text{alkyl-O}(C_2H_4O)_r[(C_3H_6O)_s(C_2H_4O)_t]_n(C_3H_6O)_uH \qquad (II)$$

where one of r and u, but not both, is zero; s, t, and n are all positive integers, and the total of r+u+((n)(s+t)) is about 25 to about 45.

5. The defoaming concentrate composition of claim 4 wherein ((n)(s))+u is about 18 to about 27; t is about 9 to about 18; and n is 1.

6. The defoaming concentrate composition of claim 1 wherein component (d) and (e) together comprise about 12% to about 14% by weight of the total concentrate composition.

7. The defoaming concentrate of claim 1 wherein components (d) and (e) are present in the ratio of about 6:1 to about 8:1.

8. A defoaming concentrate resulting from the mixture of about 1 to about 90% by weight of a mixture of at least three defoaming agents and about 99 to about 10% by weight of a mixture of stabilizers therefor, and optionally a carrier therefor, said mixture of at least three defoaming agents comprising
defoamer (a) which is selected from the group consisting of hydrophilic, fumed, particulate silicas and mixtures thereof;
defoamer (b) which is selected from the group consisting of ethylene oxide-propylene oxide block copolymers and mixtures thereof; and
defoamer (c) which is selected from the group consisting of poly(oxyethylene/polyoxypropylene) mono- $C_6$, $C_8$, and $C_{10}$ linear alkyl ethers and mixtures thereof; wherein components (a), (b), and (c) are present in about equal amounts by weight; and said mixture of stabilizers comprising:
stabilizer (d), which is selected from the group consisting of ethoxylated $C_{12\text{-}18}$ fatty alcohols having a molecular weight of about 800 to about 840 and mixtures thereof; and
stabilizer (e), which is selected from the group consisting of cross-linked (meth)acrylic acid homopolymers and cross-linked acrylic acid/methacrylic acid copolymers and mixtures thereof.

9. A diluted defoaming composition comprising up to about 99.97 parts by volume of a carrier and at least 0.03 parts by volume of the concentrate of claim 1.

10. A diluted defoamer composition resulting from the mixture about 99.97 parts by volume of a carrier and at least 0.03 parts by volume of the concentrate of claim 1.

11. A non-foaming or reduced foaming cleaning composition comprising a foaming detergent and the concentrated composition of claim 1.

12. A non-foaming or reduced foaming cleaning composition comprising a foaming detergent and the diluted composition of claim 9.

13. A non-foaming or reduced foaming cleaning composition which results from the admixture of a foaming detergent composition, at least three defoamers (a), (b), and (c), and at least two stabilizers (d) and (e)
wherein defoamer (a) is selected from the group consisting of hydrophilic, fumed, particulate silicas and mixtures thereof;
defoamer (b) is selected from the group consisting of ethylene oxide-propylene oxide block copolymers and mixtures thereof; and
defoamer (c) is selected from the group consisting of poly(oxyethylene/polyoxypropylene) mono- $C_6$, $C_8$, and $C_{10}$ linear alkyl ethers and mixtures thereof; wherein components (a), (b), and (c) are present in about equal amounts by weight;
stabilizer (d) is selected from the group consisting of ethoxylated $C_{12\text{-}18}$ fatty alcohols having a molecular weight of about 800 to about 840 and mixtures thereof; and
stabilizer (e) is selected from the group consisting of cross-linked (meth)acrylic acid homopolymers and cross-linked acrylic acid/methacrylic acid copolymers and mixtures thereof.

14. A method of reducing or preventing foam associated with a foaming detergent composition during a cleaning operation comprising applying the concentrated composition of claim 1 before, during, or after a cleaning operation with said foaming detergent composition.

15. A method of reducing or preventing foam associated with a foaming detergent composition during a cleaning operation comprising applying the diluted composition of claim 9 before, during, or after a cleaning operation with said foaming detergent composition.

16. A defoaming concentrate composition comprising about 1 to about 90% by weight of a mixture of at least three defoaming agents and about 99 to about 10% by weight of a mixture of stabilizers therefor, and optionally a carrier therefor, said mixture of at least three defoaming agents comprising
defoamer (a) which is selected from the group consisting of hydrophilic, fumed, particulate silicas and mixtures thereof;
defoamer (b) which is selected from the group consisting of ethylene oxide-propylene oxide block copolymers and mixtures thereof; and
defoamer (c) which is selected from the group consisting of poly(oxyethylene/polyoxypropylene) mono- $C_6$, $C_8$, and $C_{10}$ linear alkyl ethers and mixtures thereof; wherein components (a)–(c), in the aggregate comprise about 86 to about 87% of the total concentrate composition and said mixture of stabilizers comprising:
stabilizer (d), which is selected from the group consisting of ethoxylated $C_{12\text{-}18}$ fatty alcohols having a molecular weight of about 800 to about 840 and mixtures thereof and
stabilizer (e), which is selected from the group consisting of cross-linked (meth)acrylic acid homopolymers and cross-linked acrylic acid/methacrylic acid copolymers and mixtures thereof.

17. The defoaming concentrate composition of claim 16 wherein component (d) and (e) together comprise about 12% to about 14% by weight of the total concentrate composition.

18. The defoaming concentrate of claim 16 wherein components (d) and (e) are present in the ratio of about 6:1 to about 8:1.

19. A diluted defoaming composition comprising the concentrated composition of claim 16 and a suitable carrier therefore, wherein said carrier comprises up to 99.97% by volume of the entire diluted composition.

* * * * *